(12) United States Patent
Walther et al.

(10) Patent No.: US 6,319,969 B1
(45) Date of Patent: Nov. 20, 2001

(54) INTERPOLYMER COMPOSITIONS FOR USE IN SOUND MANAGEMENT

(75) Inventors: Brian W. Walther, Lake Jackson, TX (US); Timothy E. Clayfield, Bellevue (CH); Stephen R. Betso, Leipzig (DE); Stephen M. Hoenig, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/374,096

(22) Filed: Aug. 12, 1999

Related U.S. Application Data

(63) Continuation-in-part of application No. 08/882,819, filed on Jun. 26, 1997, now Pat. No. 5,973,049.

(51) Int. Cl.$^7$ .................................................. C08K 5/09
(52) U.S. Cl. .............................................. 524/300; 524/394
(58) Field of Search ................................ 524/425, 394, 524/300

(56) References Cited

U.S. PATENT DOCUMENTS

| | | | |
|---|---|---|---|
| 3,484,405 | 12/1969 | Seto | 260/33.6 |
| 4,076,698 | 2/1978 | Anderson et al. | 526/348 |
| 4,263,196 | 4/1981 | Schumacher et al. | 260/33.6 |
| 4,386,187 | 5/1983 | Grancio e tal. | 525/96 |
| 4,434,258 | 2/1984 | Schumacher et al. | 524/13 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,096,867 | 3/1992 | Canich | 502/103 |
| 5,132,380 | 7/1992 | Stevens et al. | 526/126 |
| 5,189,192 | 2/1993 | LaPointe et al. | 556/11 |
| 5,244,996 | 9/1993 | Kawasaki et al. | 526/347 |
| 5,321,106 | 6/1994 | LaPointe | 526/126 |
| 5,347,024 | 9/1994 | Nickias et al. | 556/11 |
| 5,350,723 | 9/1994 | Neithamer et al. | 502/104 |
| 5,374,696 | 12/1994 | Rosen et al. | 526/126 |
| 5,399,635 | 3/1995 | Neithamer et al. | 526/126 |
| 5,414,031 | 5/1995 | Knox | 524/101 |
| 5,460,818 | 10/1995 | Park et al. | 426/415 |
| 5,703,187 | 12/1997 | Timmers | 526/282 |
| 5,872,201 | 2/1999 | Cheung et al. | 526/282 |
| 5,883,213 | 3/1999 | Arai et al. | 526/347 |

FOREIGN PATENT DOCUMENTS

| | | | |
|---|---|---|---|
| 0 304 030 A2 | 2/1989 | (EP) | C08L/53/00 |
| 416815 | 3/1991 | (EP) | C08F/10/00 |
| 0 467 549 A2 | 1/1992 | (EP) | C09K/21/00 |
| 95/32095 | 11/1995 | (WO) | B32B/27/32 |
| 94/00500 | 1/1994 | (WO) | C08F/10/00 |
| 96/07681 | 3/1996 | (WO) | C08F/212/00 |
| 99/00449 | 1/1999 | (WO) | C08K/3/00 |

OTHER PUBLICATIONS

G. Witucke, "A Silane Primer: Chemistry and Applications of Alkoxy Silanes", *J. Coatings and Technology,* vol. 65, No. 882, p. 57, Jul. 1993.

K. Kircher, Chemical Reactions in Polymer Process, pp. 62–63, Hanser Press, 1987.

Plastic Technology, Sep. 1992, p. 25.

Toru Aria et al ., *Polymer Reprints,* vol. 39, No. 1, Mar. 1998.

James C. Randall, Polymer Sequence Determination Carbon–13 NMR Method, pp. 71–78, (1977).

International Search Report dated Sep. 22, 2000 issued by the EPO acting as the International Searching Authority in PCT/US00/15232.

International Search Report dated Nov. 7, 2000 issued by the EPO acting as the International Searching Authority in PCT/US00/21449.

Derwent Abstract 1999–400289.

*Primary Examiner*—Edward J. Cain

(57) ABSTRACT

Disclosed are novel compositions of ethylene and/or α-olefin/vinyl or vinylidene interpolymers and an organic acid and a filler. Also disclosed are compositions including ethylene and/or α-olefin/vinyl or vinylidene interpolymers, an organic acid, various processing agents, coupling agents and a filler. The compositions disclosed herein are particularly useful in sound management applications, or as insulators.

47 Claims, 1 Drawing Sheet

TEST SAMPLE FOR OBERST BAR DAMPING TESTS

Bar Without Roots

INTERPOLYMER COMPOSITIONS FOR USE IN SOUND MANAGEMENT

CROSS-REFERENCE TO RELATED APPLICATIONS

This application is a continuation-in-part of U.S. application Ser. No. 08/882,819, filed Jun. 26, 1997 U.S. Pat. No. 5,973,049, which is incorporated herein by reference.

STATEMENT REGARDING FEDERALLY SPONSORED RESEARCH OR DEVELOPMENT

Not Applicable

FIELD OF THE INVENTION

The present invention pertains to certain novel compositions containing an α-olefin/vinyl or vinylidene interpolymer, an organic acid and optionally one or more coupling agents and optionally one or more fillers. The interpolymers contained in the compositions of the claimed inventions may further contain polymerizable ethylenically unsaturated monomers, or may be blended with additional polymers. The present invention also pertains to the use of such compositions in sound management.

BACKGROUND OF THE INVENTION

The generic class of materials of α-olefin/vinyl or vinylidene monomer substantially random interpolymers, including materials such as substantially random (α-olefin/vinyl aromatic monomer interpolymers, and their preparation, are known in the art, such as described in U.S. Pat. No. 5,703,187 (EP416,815 A2), and in U.S. Pat. No. 5,872,201 the entire contents of which are incorporated herein by reference.

These materials offer a wide range of material structures and properties that make them useful for varied applications. Examples of useful applications for these substantially random interpolymers include their use as asphalt modifiers or compatibilizers for blends of polyethylene and polystyrene, as described in U.S. Pat. No. 5,460,818. Also, materials containing α-olefin/vinyl or vinylidene substantially random interpolymers display good elastic properties and energy dissipation capacities, and thus are also useful in adhesive systems, as described in U.S. Pat. No. 5,244,996.

Although useful in these and other applications, industry is constantly seeking to broaden and improve the applicability of α-olefin/vinyl or vinylidene interpolymer containing materials. To perform well in certain applications, it may be desirable to modify the properties of interpolymer-containing materials. For example, it is desired to extend the range of temperatures in which these interpolymers may be utilized. Other properties which are desirable to modify include processing and/or fabrication characteristics, glass transition temperatures ($T_g$), modulus, hardness, viscosity, elongation, fire retardation, density, melt index (MI), tensile strength, compatibility with other materials in composition, and virtually any other property. Industry is also interested in achieving modifications of various physical parameters without detrimentally effecting other preferred polymer properties. Any advantageous modifications are especially useful if achieved in a cost-effective manner.

Development of interpolymers that can be highly filled is sought, in particular, for sound management applications. Prior attempts to formulate compositions particularly useful for sound management applications use highly filled ethylene-vinylacetate copolymers (EVA). These highly filled blends are deficient, however, in that they possess physical properties that restrict available fabrication techniques. For example, EVA-based formulations must be kept at processing temperatures below 185° C. to prevent degradation.

Thus, there is a need for other materials without these restrictions. For example, there is a need for materials based on α-olefin/vinyl or vinyledene monomer substantially random interpolymers with superior performance characteristics to unmodified polymers and the prior art. In particular, there is a great need for economic forms of this class of materials, which are highly processable.

SUMMARY OF THE INVENTION

The compositions disclosed and claimed herein provide industry with economical and advantageous forms of materials effective, in particular, for applications requiring sound management. The compositions provided by the present inventions are typically effective for both sound blocking and vibration damping.

The compositions generally display excellent physical properties amenable to a wide range of fabrication techniques, and are often recyclable, thus may be re-used or re-applied to various applications.

The present invention pertains to compositions comprising a substantially random interpolymer comprising polymer units derived from ethylene and/or at least one $C_{3-20}$ α-olefin with at least one vinyl or vinylidene aromatic monomer, or at least one sterically hindered aliphatic or cycloaliphatic vinyl or vinylidene monomer, or a combination of at least one vinyl or vinylidene aromatic monomer and at least one sterically hindered aliphatic or cycloaliphatic vinyl or vinylidene monomer. The interpolymer component of the disclosed compositions may also further comprise polymer units derived from additional and different ethylenically unsaturated polymerizable monomers. The interpolymer component of the disclosed compositions may even be blended with a one or more other polymers.

The composition still further comprises, in addition to the interpolymer, an organic acid. They composition may also comprise a processing agent, a filler, or both, as well as other additives.

In additional embodiments, the present invention provides a process for making the disclosed compositions. In still other embodiments, the present invention provides products made from the disclosed compositions, and products made by the disclosed processes. Further additional embodiments provide sound management compositions fabricated with the disclosed compositions and according to the disclosed processes.

DETAILED DESCRIPTION OF THE INVENTION

Figure 1:
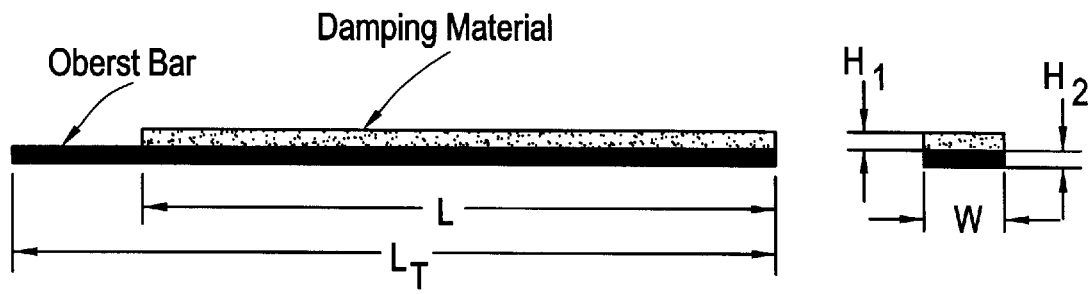
FIG. 1 is a cross-sectional illustration of an Oberst test bat having a free length, L, a total length, $L_T$, a width, W, a thickness in the vibration direction, $H_2$, and a thickness of damping material, $H_1$.

The present invention provides a significant improvement over the state of the art. Provided are novel compositions comprising substantially random ethylene and/or α-olefin/vinyl or vinylidene interpolymers, and an organic acid. The interpolymers may further comprise additional monomers to form terpolymers, or higher level polymers. They also may be blended with additional polymers, and may further include a variety of processing agents and fillers. It may also be the case that the individual monomers, or the claimed interpolymers and polymer blends, interact with each other or any of the other constituents of the claimed compositions, to form compositions that are more properly identified as the reaction products of the initial components. All such compositions are specifically contemplated to be within the scope of the present invention.

The compositions of this invention prove particularly useful as a new and novel means of managing sound in a variety of circumstances. Provided herein are compositions comprising ethylene and/or α-olefin and vinyl or vinylidene substantially random interpolymers and organic acid. Further provided are methods of using these compositions in sound management.

The term "interpolymer" is used herein to indicate a polymer wherein two or more different monomers are polymerized to make the interpolymer.

The term "substantially random" in the substantially random interpolymer comprising ethylene and/or an α-olefin and a vinyl or vinylidene monomer as used herein means that the distribution of the monomers of said interpolymer can be described by the Bernoulli statistical model or by a first or second order Markovian statistical model, as described by J. C. Randall in POLYMER SEQUENCE DETERMINATION, Carbon$^{13}$ NMR Method, Academic Press New York, 1977, pp. 71–78. Preferably, the substantially random interpolymer comprising an α-olefin and a vinyl or vinylidene monomer does not contain more than 15 percent of the total amount of vinyl or vinylidene monomer in blocks of more than 3 units. More preferably, the interpolymer was not characterized by a high degree of either isotacticity or syndiotacticity. This means that in the carbon-13 NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The term "composition" as used herein includes a mixture of the materials which comprise the composition, as well as, products formed by the reaction or the decomposition of the materials which comprise the composition. Specifically included within the compositions of the present invention are grafted or coupled compositions wherein a coupling agent is present and reacts with at least a portion of the one or more interpolymers and/or at least a portion of the one or more fillers.

The term "derived from" means made or mixed from the specified materials, but not necessarily composed of a simple mixture of those materials. Compositions "derived from" specified materials may be simple mixtures of the original materials, and may also include the reaction products of those materials, or may even be wholly composed of reaction or decomposition products of the original materials.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Interpolymers and Interpolymer/Polymer Blends

The polymers of the present invention include interpolymers derived from ethylene and/or α-olefin monomers and vinyl or vinylidene monomers. Ideally, the interpolymers of the present invention are at least copolymers, with the constituent comonomers distributed substantially randomly to form a substantially random interpolymer. Also specifically contemplated by the present invention are substantially random interpolymers made by polymerizing more than two monomeric species. The monomers that are polymerized to form the interpolymers of the disclosed compositions may remain substantially intact during the polymerization process, or may be substantially transformed or inter-react during the polymerization process.

Monomers that are acceptable for use in the interpolymers of the present invention include, for example, ethylene and/or any α-olefin and any vinyl or vinylidene monomer. Suitable α-olefins include, for example, α-olefins containing from 3 to about 20, preferably from 3 to about 12, more preferably from 3 to about 8 carbon atoms. Particularly suitable are ethylene, propylene, butene-1, 4-methyl-1-pentene, hexene-1 and octene-1. These α-olefins do not contain an aromatic moiety.

Examples of useable vinyl or vinylidene monomers include vinyl or vinylidene aromatic monomers, cycloaliphatic monomers, and any sterically hindered vinyl or vinylidene monomers. The interpolymers of the present invention may also include one or more additional polymerizable ethylenically unsaturated monomers.

Suitable vinyl or vinylidene aromatic monomers, which can be employed to prepare the interpolymers used in the compositions of the present invention, include, for example, those represented by the following formula:

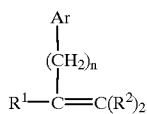

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl or vinylidene aromatic monomers include styrene, vinyl toluene, α-methylstyrene, t-butyl styrene, chlorostyrene, including all isomers of these compounds, and the like. Particularly suitable monomers include styrene and lower alkyl- or halogen-substituted derivatives thereof. Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl or vinylidene monomer is styrene.

Also included are the hindered aliphatic or cycloaliphatic vinyl or vinylidene compounds, by which is meant addition polymerizable vinyl or vinylidene monomers corresponding to the formula:

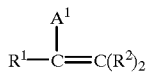

wherein $A^1$ is a hindered aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system and in which one of the carbon atoms bearing ethylenic unsaturation is tertiary or quaternary substituted.

The term "hindered" means that the monomer bearing this substituent is normally incapable of addition polymerization by standard Ziegler-Natta polymerization catalysts at a rate comparable with ethylene polymerizations. Examples of such substituents include cyclic aliphatic groups such as cyclohexyl, cyclohexenyl. cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene. Simple linear non-branched α-olefins including for example, α-olefins containing from 3 to about 20 carbon atoms such as propylene, butene-1,4-methyl-1-pentene, hexene-1 or octene-1 are not examples of sterically hindered aliphatic or cycloaliphatic vinyl or vinylidene compounds.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The most prefered substantially random interpolymers for use in the present invetion are the ethylene/styrene and ethylene/propylene/styrene interpolymers.

The interpolymers of one or more α-olefins and one or more vinyl or vinylidene aromatic monomers and/or one or more hindered aliphatic or cycloaliphatic vinyl or vinylidene monomers employed in the present invention are substantially random polymers. These interpolymers usually contain from about 0.5 to about 65, preferably from about 5 to about 55, more preferably from about 8 to about 50 mole percent of at least one vinyl or vinylidene aromatic monomer and/or hindered aliphatic or cycloaliphatic vinyl or vinylidene monomer and from about 35 to about 99.5, preferably from about 45 to about 95, more preferably from about 50 to about 92 mole percent of ethylene and/or at least one aliphatic αolefin having from 3 to about 20 carbon atoms.

The melt index, $I_2$, (ASTM D-1238, 190° C./2.16 kg)of the substantially random interpolymers is from about 0.01 to about 100, preferably from about 0.1 to about 30, more preferably from about 0.3 to about 15 g/10 min.

Also within the scope of this invention are interpolymers in a blended composition with other polymers. Any other polymer may be used for blending with the interpolymer according to this invention. Additional polymers blended with the interpolymers of the present invention may prove especially useful in manipulating the properties and/or processability of the total composition. For example, a certain degree of mechanical strength is required for the shaping process when molding the claimed compositions into sound managing articles. If these requirements are not met, the shaping process is degraded, and automation of the thermo-forming process is not possible. The use of additional polymers to form a blended polymer-interpolymer component in the claimed compositions may provide more preferred mechanical strength or tensile strength characteristics. One of skill in the art will choose polymers that impart certain desired characteristics to the final blend-containing composition.

An additional advantageous result of blending the interpolymer with another polymer is economic in nature. The interpolymers of the claimed compositions may be made increasingly cost efficient when combined with less expensive polymers in a blended composition that displays desirable characteristics. Indeed, the cost savings provided by integrating less expensive materials into the claimed compositions is acknowledged as an important manufacturing advantage of the disclosed compositions. Accordingly, one attribute of the present invention is that the interpolymer component of the claimed composition is particularly amenable to blending with other polymers. For example, an important factor in converting manufacturers from the use of current formulations to compositions containing α-olefin/vinyl or vinylidene interpolymers is compatibility with the materials currently in use by that manufacturer. If a manufacturer uses the interpolymer compositions disclosed herein alongside existing formulations, any mixtures made during transition from one material to the next is of saleable quality and may even display superior characteristics. Furthermore, the provided interpolymers may be blended with other production scrap, such as edge-trim or rejected parts within the factory, or from post consumer waste or recycled vehicle parts to provide particularly economical compositions.

As is clear from the discussion above, the present invention expressly includes compositions in which an additional polymer is blended with the interpolymer in amounts necessary to impart desirable qualities to the composition as a whole. Alternatively, it is also envisioned that trace amounts of additional polymers may be "blended" with the interpolymer of the composition such that no measurable change in composition characteristics is observed. This embodiment is advantageous when the disclosed interpolymer compositions are manufactured in a system still containing residual amounts of polymer that may have been previously synthesized or otherwise processed in that system. Likewise, a further advantage of the presently disclosed compositions is that they can be mixed with any number of such materials in manufacturing processes.

Acceptable polymers to blend with the claimed interpolymers include styrenic homopolymers and copolymers, and ethylene homopolymers and copolymers such as HDPE, LDPE and LLDPE. Prefered polymers include Engage™ (a trademark and product of Du Pont Dow Elastomers), polyolefins (PO) and polyolefin elastomers (POE), including any co-polymers such as ethylene/octene, ethylene/hexene and ethylene/butene, ethylene/propylene, EPDM, Exact polymers (a trademark and product of Exxon Chemical), very- or ultra-low density polyethylenes (VLDPE or ULDPE) such as Enichem's Clearflex™, styrene-butadiene random co-polymers (SBR) or (SBS) or styrenic block polymers, ethyl vinyl acetate (EVA), Affinity™ (a trademark and product of The Dow Chemical Company) polyolefin plastomers (POPs), and nylon, and also homopolymers and interpolymers of propylene, including but not limited to, polypropylene (PP), and polypropylene copolymers (CPP).

In particular, all of these can be mixed with the claimed interpolymers to form sound management compositions without loss of desired properties. This result is surprising because, used alone, these additional polymers cannot support the extreme filler levels that the interpolymers can— both alone and in combination as blends. For example, Engage™, or EVA, or Engage™/EVA heavy layers, when used without the polymers and polymer blends disclosed herein, undergo a sharp drop in mechanical properties such as tensile strength or elongation at between 52 and 55 volume percent filler. Above this level, the elongation to break at 80° C. is below the 100 percent required for thermoforming and the sheet will break or form pinholes. In contrast, the claimed compositions can be filled to 65 percent or more by volume. Further, the claimed compositions maintain their capacity to be highly filled even upon addition of still other polymers to form a blended polymer interpolymer-containing composition. The ability to blend these additional polymers with the disclosed interpolymers is further advantageous because the other polymers amenable to blending may be generally less expensive than the interpolymers alone.

By being able to add scrap or recycle polymer to the composition, or by adding these polymers in virgin form, the economics of the plant and the product produced can be kept at very favorable levels, and the need to separate waste streams within the plant is eliminated (adding further economic value to the disclosed compositions). The use of blend polymers in these compositions therefore increases the value per pound of the composition, allowing the formulation of extremely cost-efficient compositions amenable to a variety of applications.

Synthesizing the Interpolymers and Blends

While preparing the substantially random interpolymers, as will be described hereinafter, an amount of atactic vinyl or vinylidene aromatic homopolymer may be formed due to homopolymerization of the vinyl or vinylidene aromatic monomer at elevated temperatures, at some point in the manufacturing process. The presence of vinyl or vinylidene aromatic homopolymer is in general not detrimental for the purposes of the present invention and may be tolerated. The vinyl or vinylidene aromatic homopolymer may be separated from the interpolymer, if desired, by extraction techniques such as selective precipitation from solution with a non-solvent for either the interpolymer or the vinyl or vinylidene aromatic homopolymer. For the purpose of the present invention, it is preferred that the level of the vinyl or vinylidene aromatic homopolymer be no more than 20, preferably less than 15, more preferably less than 10 weight percent, of the total weight of the polymer component of the composition.

The substantially random interpolymers may be modified by typical grafting, hydrogenation, functionalizing, crosslinking or other reactions well known to those skilled in the art. The polymers may be readily sulfonated or chlorinated to provide functionalized derivatives according to established techniques.

The substantially random interpolymers are prepared by polymerizing a mixture of polymerizable monomers in the presence of metallocene or constrained geometry catalysts. For example, they can be prepared as described in U.S. application Ser. No. 545,403 filed Jul. 3, 1990 (corresponding to EP-A-0,416,815) by James C. Stevens et al., and in U.S. Pat. No. 5,872,201, both of which are incorporated herein by reference. Preferred operating conditions for such polymerization reactions are pressures from atmospheric up to 3000 atmospheres (300 MPa) and temperatures from −30° C. to 200° C.

Examples of suitable catalysts and methods for preparing the substantially random interpolymers are disclosed in EP-A-416,815; EP-A-514,828; EP-A-520,732; U.S. application Ser. No. 241,523, filed May 12, 1994; as well as U.S. Pat. Nos. 5,055,438; 5,057,475; 5,096,867; 5,064,802; 5,132,380; 5,189,192; 5,321,106; 5,347,024; 5,350,723; 5,374,696; and 5,399,635, all of which are incorporated herein by reference.

The substantially random α-olefin/vinyl or vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated by reference in their entirety.

The substantially random αolefin/vinyl or vinylidene aromatic interpolymers can also be prepared by the methods described in JP 07/278230 employing compounds shown by the general formula

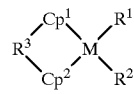

where ($Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

Also suitable are the substantially random interpolymers which possess at least one α-olefin/vinyl aromatic/vinyl aromatic/α-olefin tetrad disclosed in a copending application by Jasson T. Patton et al., entitled "New α-olefin/ Vinylidene Aromatic Monomer and/or Hindered Aliphatic or Cycloaliphatic Vinylidene Monomer Interpolymers, filed on Sep. 4, 1996, incorporated herein by reference. These interpolymers contain additional signals with intensities greater than three times the peak to peak noise. These signals appear in the chemical shift range 43.75–44.25 ppm and 38.0–38.5 ppm. Specifically, major peaks are observed at 44.1, 43.9 and 38.2 ppm. A proton test NMR experiment indicates that the signals in the chemical shift region 43.75–44.25 ppm are methine carbons and the signals in the region 38.0–38.5 ppm are methylene carbons.

In order to determine the carbon-13 NMR chemical shifts of these interpolymers, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, for example an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers are prepared by conducting the polymerization at temperatures of from about −30° C. to about 250° C. in the presence of such catalysts as those represented by the formula

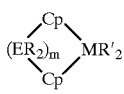

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two R' groups together can be a $C_1$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

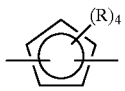

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl))zirconium dichloride, racemic-(dimethylsilanediyl)-bis-(2-methyl-4-phenyl-indenyl)) zirconium 1,4-diphenyl-1,3-butadiene, racemic-(dimethylsilanediyl)-bis-(2-methyl-4-phenylindenyl)) zirconium di-$C_{1-4}$ alkyl, racemic-(dimethylsilanediyl)-bis-(2-methyl-4-phenylindenyl))zirconium di-$C_{1-4}$ alkoxide, or any combination thereof.

Further preparative methods for the substantially random interpolymer have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylaluminoxane (MAO) and cyclopentadienyltitanium trichloride ($CpTiCl_3$) to prepare an ethylene-styrene copolymer. Xu and Lin (*Polymer Preprints, Am.Chem.Soc.,Div. Polym. Chem.*) Volume 35, pages 686,687 [1994]) have reported copolymerization using a $TiCl_4/NdCl_3/Al(iBu)_3$ catalyst to give random copolymers of styrene and propylene. Lu et al. (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (Macromol. Chem. Phys., volume 197, pages 1071 to 1083 [1997]) have described the influence of polymerization conditions on the copolymerization of styrene with ethylene using $Me_2Si(Me_4Cp)(N$-tert-butyl)$TiCl_2$/ methylaluminoxane catalysts. The manufacture of α-olefin/vinyl aromatic monomer interpolymers such as ethylene/sytrene, propylene/styrene and butene/styrene are described in U.S. Pat. No. 5,244,996, issued to Mitsui Petrochemical Industries Ltd, or as disclosed in DE 197 11 339 A1 and U.S. Pat. No. 5,883,213 both to Denki Kagaku Kogyo K K. All the above methods disclosed for preparing the interpolymer component are incorporated herein by reference. Also the random copolymers of ethylene and styrene as disclosed in Polymer Preprints Vol. 39, No. 1, March 1998 by Toru Aria et al. can also be employed as blend components for the present invention. All of the above methods disclosed for preparing the substantially random interpolymer are incorporated herein by reference.

The polymerization may be carried out in solution, slurry, or gas phase polymerization reactions. Further, the polymerization may be carried out as a batchwise or a continuous polymerization process. In a continuous process, ethylene, vinyl or vinylidene aromatic monomer or hindered aliphatic vinyl or vinylidene monomer, and solvent and the optional propylene or alternate third monomer are continuously supplied to the reaction zone and polymer product continuously removed therefrom.

In general, the substantially random interpolymer may be polymerized at conditions for Ziegler-Natta or Kaminsky-Sinn type polymerization reactions, that is, reactor pressures ranging from atmospheric to 3500 atmospheres (355 MPa). The reactor temperature will typically be from about −30° C. to about 200° C. Preferably, the reactor temperature will be greater than 50° C., typically from 70° C. to 200° C., and preferably from 80° C. to 150° C., with temperatures at the higher end of the range, that is, temperatures greater than 100° C. favoring the formation of lower molecular weight polymers. Polymerizations and unreacted monomer removal at temperatures above the autopolynierization temperature of the respective monomers may result in the formation of some amounts of homopolymer polymerization products resulting from free radical polymerization.

In the case of a slurry polymerization process, the substantially random interpolymer may be prepared using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or in part as the diluent. Most preferably the diluent comprises, in at least a major part, the monomer or monomers to be polymerized.

Once prepared, the substantially random interpolymer may be blended with additional polymers, according to the needs of the particular formulator, to form a useful blended polymer composition. The interpolymers of the present invention may be blended with other polymers to form various types of blends. Types of blends that are useful in the compositions disclosed herein include mechanical blends, in which the polymers are mixed at temperatures above the $T_g$ or $T_m$ for the amorphous or crystalline polymers respectively. Also included are mechanochemical blends in which the polymers are mixed at shear rates high enough to cause degradation. When using mechanochemical blends, care must be taken to control combination of resultant free radicals, which form complex mixtures including graft and block compositions. Solution-cast blends and latex blends are also useful according to the present invention; as are a variety of interpenetrating polymer network blends.

The polymer blends of the present invention can be prepared by any conventional compounding operation, such as for example single and twin screw extruders, Banbury mixers, Brabender mixers, Farrel continuous mixers, and two roll mills. The order of mixing and the form of the blend components to be mixed is not critical; but rather, it may vary depending on the particular requirements or needs of the individual compounder. The mixing temperatures are preferably such that an intimate blend is obtained of the components. Typical temperatures are above the softening or melting points of at least one of the components, and more preferably above the softening or melting points of all the components.

Organic Acid

In addition to the interpolymers or interpolymer-polymer blends described above, the claimed compositions also contain an organic acid. The organic acid is added in an amount sufficient to lower the torque required in the mixing equipment, or to lower the viscosity of the remainder of the composition, or to otherwise improve the flow of the composition during processing and fabrication, or both. For example, the addition of as little as 0.3 weight percent stearic acid may decrease the torque by up to 50 percent or more on the mixing rotors. The extreme torque peak seen upon addition of filler to the composition may also be decreased relative to the case with no acid. Depending upon the additional components of the composition, the acid may have other functional effects. For example, when extremely high levels of filler are added to the composition, the organic acid may serve as a dispersant, allowing the filler component to be more evenly distributed throughout the composition. The acid may be added at any point in the production process or it may be added in stages. Alternatively or additionally, it may be added as a coating to other additives to the composition, such as the filler. When such a coated filler is used, the filler is generally coated with the acid prior to its mixture with the other components of the composition.

Organic acids over a wide range of saturated acid types, from $C_6$ monobasic saturated carboxylic acids such as caproic to long-chain types such as $C_{22}$ (behenic) fatty acids, are highly effective in enhancing elongation and in increasing melt index. A concomitant decrease in blend stiffness is generally also attained. Further, as mentioned above, addition of organic acid, promotes dispersion of the filler, or other additives, throughout the composition.

In addition to monomeric organic acids, the so-called 'dimer' and 'trimer' acids (dimers and trimers of the simpler straight-chain forms) having up to 54 carbon atoms are also highly effective. Mixtures of the above mentioned acids may be employed, as may mixtures of any of the acid types disclosed herein.

Saturated polybasic acids are also effective, as are mono- or polyunsaturated organic acids, including the $C_{12}$ to $C_{20}$ mono- and dicarboxylic acids, and, in particular, oleic acid (mono-unsaturated $C_{18}$-type fatty acid) are also highly effective.

Cyclic organic acid 'analogs' of the fatty acids are also effective for practicing this invention. Both alicyclic (saturated) and aromatic (unsaturated, benzene-related ring structures with carboxylic group) may be used. The various attributes of all these acids, known to those skilled in the art, are considered when chosing an acid for use in the compositions of the present invention.

Mono-, di- and trivalent metal salts of organic acids, in particular the calcium, magnesium and zinc salts of fatty acids, are very effective in carrying out the purposes of this invention. Esters and amides of the organic acids are also effective. The number of organic acids in existence is enormous; the examples named above can be replaced by other close analogs, as known by those of skill in the art, with good results and without departing from the spirit of this invention.

The preferred organic acids are selected from the group consisting of saturated mono-, di- and tricarboxylic acids having from 6 to 54 carbon atoms; unsaturated mono- and dicarboxylic acids having from 12 to 20 carbon atoms; and calcium, magnesium and zinc salts of said acids. The most preferred organic acids are selected from the group consisting of palmitic, stearic and oleic acids, dimers and trimers thereof, and mixtures of these acids.

In using organic acids of the types described in the compositions of this invention the preferable amount is from about 0.01 to about 5 percent by weight, and preferably from about 0.05 to about 2 percent. Most preferably, when using a fatty acid which is particularly effective, the amount is from about 0.1 to about 1.0 percent by weight.

When the composition comprises solely an oil and one or more substantially random interpolymers, the substantially random interpolymer comprises from about 4.9 to about 99.99 weight percent of the composition.

Fillers

One of the advantages of the disclosed compositions is their ability to maintain desirable fabrication characteristics with very high filler levels. In addition to blending the interpolymers of the present invention with less expensive polymers, formulating cost efficient compositions is also aided by the use of fillers. The attainment of filler loadings of approximately 50 percent by volume, and above, while maintaining adequate mechanical properties is favorable to the formulation of economical compositions, and results in compositions particularly useful for sound management applications. Addition of an organic acid improves dispersion of a filler in the composition, and thus further facilitates achieving preferable filler loading levels in an economical manner. Points of novelty in the presently disclosed compositions include their capacity to be highly filled and for the filler to be evenly dispersed via the use of an organic acid.

An additional advantage of the claimed compositions, and another example of where they provide an improvement over the prior art, is their ability to maintain desirable mechanical properties over a wide range of filler levels. The addition of moderate levels of filler to the claimed novel compositions can provide an excellent feel to the final article. Further, as noted, the capacity of the disclosed compositions to sustain addition of high levels of filler makes them particularly useful in the manufacture of sound management materials.

The percentage of filler that can be included in the composition of the present invention on a weight basis is primarily a function of the density of the filler. Particle size and shape of the filler also will effect the properties of the composition. For example, ultra fine particle size fillers (less than 1 micron average particle size) generally have a tendency to result in higher blend viscosities and are also more expensive. Preferred fillers are calcium carbonate and barium sulfate, or a combination thereof. The amount of filler present in the composition of the present invention is from about 0.01 to about 95 percent by weight, of the composition. Preferably, the filler represents from about 5 to about 90 percent by weight. Most preferably, when using a filler of medium density, such as calcium carbonate, the amount of filler is from about 30 to about 85 percent by weight. When using a filler of higher density such as barium sulfate, the amount of filler is preferably from about 30 to about 95 percent by weight.

The level of filler in a blend composition may be described by weight or volume. The volume percent of the filler may be estimated by the equation:

$$\text{vol } \%_F = [(\text{wt } \%_F/\rho_F) \times 100\%]/[(\text{wt } \%_F/\rho_F) + \Sigma(\text{wt } \%_i/\rho_i)]$$

Where vol $\%_F$ is equal to the volume percent of the filler in the final composition, wt $\%_F$ is equal to the weight percent of the filler; $\rho_F$ is the density of the filler measured in grams per cubic centimeter (g/cm$^3$); wt $\%_i$ is the weight percent of the i$^{th}$ component; $\rho_i$ is the density of the i$^{th}$ component measured in grams per cubic centimeter (g/cm$^3$). For example, a formulation characterized as 80 weight percent filler (density=2.7 g/cm$^3$), 19.7 weight percent interpolymer (density=0.95 g/cm$^3$), and 0.3 weight percent organic acid (density=0.97 g/cm$^3$) would have a volume percent of filler of:

$$\frac{(80/2.7)\ 100\%}{(80/2.7)+(19.7/0.95)+(0.3/0.97)} = 58.5 \text{ volume percent}$$

The use of many types of fillers or combination thereof is, of course, possible without altering the fundamentals taught in this patent. For example, inclusion of alumina trihydrate (ATH, Al$_2$O$_3$.3H$_2$O) is highly desirable when flame-retardant or low-smoke-tendency blends are desired. Heavy fillers, such as powdered iron or lead, or oxides or shavings of them, can be employed when ultra-dense blends are desired. Similarly, minerals having low density, such as magnesium carbonate, magnesium oxide, magnesium hydroxide, calcium sulfate, silica, fly ash, and cement dust, or organic fillers such as yarns, wood flour, nut shells, rice hulls, cornmeal, clay, and the like, can be employed when light-density blends are preferable. Finally, fillers with varied aspect ratios, such as talc, mica, from highly acicular (wollastonite, for example) to round (glass beads, for example) can also be employed to alter relationships such as tensile strength or elongation.

Coupling Agents and Fillers

An additional aspect of the present invention includes compositions comprising an interpolymer, non-ignition resistant filler, coupling agent, and optionally an initiator. Similar compositions comprising ignition-resistant fillers are described in the patent application entitled "Compositions Having Improved Ignition Resistance," filed on the same day as the instant application and naming S. R. Betso et al., as inventors. The amount of coupling agent and/or initiator of the invention may vary according to the end-use application in which the composition is to be employed. However, if present, the amount of coupling agent and/or initiator generally comprises from about 0.1 to about 10 weight percent of the composition.

The coupling agent and/or initiator also may vary according to the end-use application in which the composition is to be employed. Typically, the coupling agent and/or initiator is selected from organic peroxides, silanes, titanates, zirconates, multi-functional vinyl compounds, organic azides, and mixtures thereof. While not wishing to be bound to any theory, it is believed that, under some conditions, the filler may become coupled, i.e., grafted, to the interpolymer or another polymer of the composition capable of such grafting. Similarly, the filler may become coupled, (i.e., grafted) to at least one filler. Thus, the filler often serves as a coupling agent, which may couple the following components:

(a) interpolymers or polymers to other interpolymers or polymers;
(b) fillers to other fillers;
(c) fillers to interpolymer or polymers; or
(d) combinations thereof.

It is believed that the interpolymer is typically grafted onto the coupling agent via a vinyl group while an active polar group on the coupling agent usually binds the coupling agent to the filler.

The extent of coupling, if any, varies depending on the amount and types of ingredients and the conditions to which the ingredients are subjected. Preferably, the amount, types of ingredients and conditions are such that at least a portion of at least one filler is coupled to at least a potion of at least one interpolymer or any other polymer component which may be present in the composition.

The above-mentioned interpolymer(s) suitable in the composition of the present invention are usually thermoplastic, i.e., the interpolymer may be molded or otherwise shaped and reprocessed at temperatures above their melting or softening point. However, when a coupling agent is present in the composition, the interpolymer may undergo some crosslinking. Thus, if a thermoplastic composition is desired then, the amount of coupling agent should be at least the amount necessary to generate the desired amount of coupling or grafting but not so much that the thermoplastic nature of the composition is jeopardized.

Even though thermoplastics are generally preferable if a non-thermoplastic composition is desired then a crosslinking process can be carried out by standard practices or by the addition of an amount of filler such that the composition, when cured, is not thermoplastic.

The coupling agent may be grafted to the interpolymer by any conventional method. Such methods and agents are described in, for example, K. Kircher, "Chemical Reactions in Polymer Processing", pp. 62–63, Hanser Press, 1987, and G. Witucki, "A Silane Primer: Chemistry and Applications of Alkoxy Silanes", *J. Coatings and Technology*, Vol. 65, No. 822, p. 57, July 1993, incorporated by reference herein.

Such methods typically include the presence of a free radical initiator such as a peroxide or an azo compound or ionizing radiation. Organic initiators, especially peroxide initiators, are preferred. Examples of peroxide initiators include dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, aluryl peroxide, di(t-butyl peroxy) 3,3,5-trimethylcyclohexane, and t-butyl peracetate. Suitable azo compounds include those such as azo-bis-isobutyl nitrite. Alternatively, the coupling agent may be coated on one or more of the fillers and the vinyl groups replaced with a group, which is compatible with the interpolymer.

Suitable coupling agents include any agent, which can be grafted to the interpolymer. Such coupling agents include, for example, silanes, titanates, zirconates, multifunctional vinyl compounds, and mixtures thereof. Typical titanates and zirconates are described in, for example, Ken-React Reference Manual, Kenrich Petrochemical Inc. 1985, incorporated herein by reference. Preferable coupling agents include silanes, vinyl alkoxy titanates, zirconates, or vinyl substituted alkoxy or arlyoxy titanates or zirconates. Particularly preferable coupling agents include those described below.

Any silane, or a mixture of such silanes, that will effectively graft to the interpolymer of the present invention, can be used as the silane moeity in the present invention. Suitable silanes include those of the general formula:

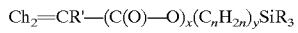

$$Ch_2=CR'—(C(O)—O)_x(C_nH_{2n})_ySiR_3$$

in which R' is a hydrogen atom or methyl group; x and y are 0 or I with the proviso that when x is 1, y is 1; n is an integer from 1 to 12 inclusive, preferably 1 to 4, and each R independently is a hydrolyzable organic group such as substituted or unsubstituted C1–12 alkoxy groups (e.g., methoxy, ethoxy, butoxy, etc.), substituted or unsubstituted aryloxy groups (e.g., phenoxy, etc.), substituted or unsubstituted aralkoxy groups (e.g., benzyloxy, etc.), substituted or unsubstituted $C_{1-12}$ aliphatic acyloxy groups (e.g., formyloxy, acetyloxy, propanoyloxy, etc.), amino or amino groups substituted with a suitable substituent such as alkyl or aryl, or a substituted or unsubstituted lower alkyl ($C_{1-6}$) group, with the proviso that not more than two of the three R groups is an alkyl (e.g., vinyl dimethyl methoxy silane). The use of "C" with a subscript range denotes the number of carbon atoms in, for example, a lower alkyl group.

Silanes are also useful which have ketoximino hydrolysable groups, such as vinyl tris(methylethylketoamino)silane. Particularly useful silanes include unsaturated silanes comprising an ethylenically unsaturated hydrocarboxyl group, such as vinyl, ally, isopropyl, butyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, propionyloxy, and alkyl or arylamino group. Preferred silanes are the unsaturated alkoxy silanes which can be grafted onto the interpolymer such as vinyl trimethoxy silane, vinyl triethoxy silane, gamma-(meth)acryloxy propyl trimethoxy silane, and mixtures thereof.

In some instances, at least a portion of the interpolymer may be coupled to at least a portion of the filler without the express inclusion of a coupling agent. This is possible, for example, if the interpolymer or the filler has a functional group, which inherently is capable of coupling. In other words, interpolymers and fillers may be prepared which are intrinsically capable of being coupled.

Processing Agents

In addition to the core components of interpolymer or interpolymer-polymer blend, and an organic acid, compositions of the present invention may further contain any one or a combination of a variety of processing agents. Examples of processing agents are those substances that function as a tackifier, an oil, a plasticizer, and antioxidant or a combination thereof. Such substances are selected for use depending upon the needs of the formulator, and the desired characteristics of the final composition. Various additional other components may also be added to the disclosed compositions, as needed to suit the needs of the formulator.

When processing agents are employed in the present invention, they may be used alone, or in combination with other processing agents, to synergistically achieve similar properties, or to achieve different resultant properties in the end composition. Effective amounts of processing agents in the present invention range from about 0.25 to about 50 percent of the composition, by weight, depending upon the particular processing agent and its role in the composition developed by an individual formulator. More preferable processing agent amounts range from about 0.3 to about 35; and, most preferably, from about 0.5 to about 25 percent by weight.

When the composition comprises a processing agent and/or filler and one or more substantially random interpolymer and one or more further polymers, said interpolymer comprises from about 25 to about 95 weight percent, and said further polymer represents from about 5 to about 75 weight percent (based on the weight of said interpolymer and said further polymer).

Tackifiers

Tackifiers that are useful in the present invention can be any number of substances, including those that are commercially available and well-known by those of skill in the art, such as those listed in U.S. Pat. No. 3,484,405, incorporated herein in its entirety. Generally, natural or synthetic resin materials, and rosin materials, work well. Prefered amounts of tackifier range from about 1 to about 50 weight percent of the composition. More preferable concentrations range from about 5 to about 25 percent, and most preferable concentrations range from about 10 to about 20 percent, by weight, of the composition.

The resins that can be employed according to the present invention are liquid, semi-solid to solid, complex amorphous materials generally in the form of mixtures of organic compounds having no definite melting point and no tendency to crystallize. Such resins are insoluble in water and can be of vegetable or animal origin, or can be synthetic resins. The resins employed function to provide substantial and improved tackiness of the composition. Suitable tackifiers include, but are not necessarily limited to the resins discussed below. A class of resin components that can be employed as the tackifier composition hereof, are the coumarone-indene resins, such as the para coumarone-indene resins. Generally the coumarone-indene resins which can be employed have a molecular weight which ranges from about 500 to about 5,000. Examples of resins of this type which are available commercially include those materials marketed as 'Picco'-25 and 'Picco'-100.

Another class of resins which can be employed as the tackifier hereof are the terpene resins, including also styrenated terpenes. These terpene resins can have a molecular weight range from about 600 to 6,000. Typical commercially available resins of this type are marketed as 'Piccolyte' S-100, as 'Staybelite Ester' #10, which is a glycerol ester of hydrogenated rosin, and as 'Wingtack' 95 which is a polyterpene resin.

Additionally, butadiene-styrene resins having a molecular weight ranging from about 500 to about 5,000 may be used as the tackifier. A typical commercial product of this type is marketed as 'Buton' 100, a liquid butadiene-styrene copolymer resin having a molecular weight of about 2,500. A fourth class of resins which can be employed as the tackifier hereof are the polybutadiene resins having a molecular weight ranging from about 500 to about 5,000. A commercially available product of this type is that marketed as 'Buton' 150, a liquid polybutadiene resin having a molecular weight of about 2,000 to about 2,500.

Another useful class of resins which can be employed as the tackifier are the so-called hydrocarbon resins produced by catalytic polymerization of selected fractions obtained in the refining of petroleum, and having a molecular weight range of about 500 to about 5,000. Examples of such resins are those marketed as 'Piccopale'-100, and as 'Amoco' and 'Velsicol' resins. Similarly, polybutenes obtained from the polymerization of isobutylene may be included as a tackifier.

The tackifier may also include rosin materials, low molecular weight styrene hard resins such as the material marketed as 'Piccolastic' A-75, disproportionated pentaerythritol esters, and copolymers of aromatic and aliphatic monomer systems of the type marketed as 'Velsicol' WX-1232. The rosin that may be employed in the present invention may be gum, wood or tall oil rosin but preferably is tall oil rosin. Also the rosin material may be a modified rosin such as dimerized rosin, hydrogenated rosin, disproportionated rosin, or esters of rosin. Esters can be prepared by esterifying the rosin with polyhydric alcohols containing 2–6 alcohol groups.

Useful tackifiers include aromatic hydrocarbon resins, including those with low softening points such as Piccovar™; and aliphatic, low molecular weight hydrocarbon resins such as Piccopale™, and those with high softening points such as Piccotac™. Additional useful tackifiers include synthetic polyterpene resins such as Wingtack™, and hydrogenated rosin, glycerol ester resins such as Foral™. These must be regarded only as typical examples, as literally hundreds of logical candidates exist. A more comprehensive listing of tackifiers which can be employed is provided in the TAPPI CA Report #55, February 1975, pages 13–20, inclusive, a publication of the Technical Association of the Pulp and Paper Industry, Atlanta, Ga., which lists well over 200 commercially available tackifier resins.

In use, the compounder generally will want to select an ethylene-based copolymer and a tackifier resin, which will be mutually compatible; chemical similarities, which will indicate compatibility, can be used for guidance. The compounder may also elect to use incompatible systems. Finally, the reverse effect may be sought. For example, where an unusually slippery surface is desired, incorporation of small amounts of a slip aid such as Armid O may prove beneficial.

Plasticizers and Oils

It may further be useful to employ any one or combination of plasticizing substances in the compositions of the present invention. The use of plasticizers in α-olefin/vinyl or vinylidene substantially random interpolymers is known in the art. For example, U.S. Pat. No. 5,739,200, specifically incorporated herein in its entirety, explains the use of plasticizers in α-olefin/vinyl or vinylidene interpolymers, and lists those plasticizing agents that are particularly useful in compositions containing α-olefin/vinyl or vinylidene interpolymers. Preferred concentrations of plasticizers range from about 0.25 to about 50 percent, by weight. More preferred concentrations range from about 0.3 to about 35 percent by weight, with most preferred concentrations ranging from about 0.5 to about 25 percent, by weight.

Suitable plasticizers which can be employed herein include at least one plasticizer selected from the group consisting of phthalate esters, trimellitate esters, benzoates, aliphatic diesters (including adipates azelates and sebacates), epoxy compounds, phosphate esters, glutarates, polymeric plasticizers (polyesters of glycols and aliphatic dicarboxylic acids) and oils.

Particularly suitable phthalate esters include, for example, dialkyl $C_4$–$C_{18}$ phthalate esters such as diethyl, dibutyl phthalate, diisobutyl phthalate, butyl 2-ethylhexyl phthalate, dioctyl phthalate, diisooctyl phthalate, dinonyl phthalate, diisononyl phthalate, didecyl phthalate, diisodecyl phthalate, diundecyl phthalate, mixed aliphatic esters such as heptyl nonyl phthalate, di-(n-hexyl, n-octyl, n-decyl) phthalate (P610), di(n-octyl, n-decyl)phthalate (P810), and aromatic phthalate esters such as diphenyl phthalate ester, or mixed aliphatic-aromatic esters such as benzyl butyl phthalate or any combination thereof and the like.

Particularly suitable trimellitate esters include, for example, tri-(2-ethylhexyl)trimellitate, tri-(heptyl, nonyl) trimellitate, tri isooctyl trimellitate, tri isodecyl trimellitate, tri-(octyl, decyl) trimellitate. Particularly suitable benzoates include, for example, diethylene glycol dibenzoate and dipropylene glycol dibenzoate. Particularly suitable epoxy compounds include, for example, epoxidised vegetable oils such as epoxidised soyabean oil and epoxidised linseed oil.

Particularly suitable phosphate esters include, for example, triaryl, trialkyl, mixed alkyl aryl phosphates such as tributyl phosphate, trioctyl phosphate, tri-(2-ethylhexyl) phosphate, tributoxyethyl phosphate, triphenyl phosphate, tricresyl phosphate, isopropylphenyl diphenyl phosphate, t-butylphenyl diphenyl phosphate, 2-ethylhexyl diphenyl phosphate and isodecyl diphenyl phosphate.

Oils may also be used in the compositions of the present invention to manipulate the characteristics of the composition. Commercial oils generally contain a range of components where the composition of the oil is reported as a percentage of napthenic, parafinic and aromatic oil. Suitable oils include virtually any known oil, including naphthenic, parafinic and aromatic oils, further including, for example, mineral oils and natural oils. Oils are generally characterized by their flashpoint and composition. According to their classification and flash point, one skilled in the art can select the oil or combination of oils that will best achieve the desired characteristics in the compositions of the present invention. Preferred oils include those commercialized under the names Shellflex™ 6371, Shellflex™ 6702, and Shellflex™ 2680.

Additionally, a mixture of plasticizer and processing oil may also be used to effectively achieve the desired properties in the resultant composition according to the present invention. For example, one may combine any processing oil with an epoxidized oil, a polyether, or a polyester to manipulate the characteristics of the composition. Indeed, using a combination of plasticizers and oils may achieve more desirable properties than using either in isolation, depending upon the constituent parts of the interpolymer or polymer blend component of the composition.

Other Additives

Other than tackifiers, plasticizers and oils, other useful additives include antioxidants (e.g., hindered phenols such as, for example, Irganox™ 1010 a registered trademark of Ciba Geigy), phosphites (e.g., Irgafo™ 168 a registered trademark of Ciba Geigy), U. V. stabilizers, cling additives (e.g., PIB), antiblock additives, slip agents, colorants, pigments blowing agents, ignition-resistant additives, Tinuvin, polyisobutylene, titanium dioxide, iron oxide pigments and the like can also be included in the compositions of the present invention.

The additives are employed in functional amounts known to those skilled in the art. For example, the amount of antioxidant employed is that amount which prevents the polymer or polymer blend from undergoing oxidation at the temperatures and environment employed during processing, storage, and ultimate end use of the polymers. By preventing oxidation, aging of the product is retarded. The amount of antioxidants is usually in the range of from about 0.01 to about 10, preferably from about 0.05 to about 5, more preferably from about 0.1 to about 2 percent by weight based upon the weight of the polymer or organic component of the composition.

Similarly, the amounts of any of the other enumerated components, as well as additives, are the functional amounts such as the amount to render the polymer or polymer blend antiblocking, to produce the desired amount of filler loading to produce the desired result, to provide the desired color from the colorant or pigment, and the like. Such additives, in particular, can suitably be employed in the range of from about 0.05 to about 50, preferably from about 0.1 to about 35 more preferably from about 0.2 to about 20 percent by weight based upon the weight of the polymer or polymer blend.

Mixing Composition Ingredients

The order of mixing the components is usually not critical. The preferred order of mixing involves the polymer component as a starting point, to which an oil may be added. Then the organic acid or other coupling agent or initiator is added, and then the filler and other processing agents or additives, such as plasticizers, tackifiers, and/or additional oils. For example, depending upon the constituents of the interpolymer or interpolymer-polymer blend component of the composition, it may or may not be necessary to add oil to the composition. Alternatively, for example, one of skill in the art may alter the sequencing of the addition of the ingredients when mixing, to successfully achieve the desired composition properties. The skilled practitioner will recognize that the properties of the individual constituent parts of the desired composition will influence how they should be mixed into the composition, including whether they should be added in stages or gradually or, in effect, at once. For example, Applicants have found that the organic acid of the present invention may be advantageously added to the composition prior to addition of the inorganic components. Alternatively, it may be added as a coating to any filler that is added. Further, guidance may be found in U.S. Pat. No. 4,263,196, incorporated by reference herein in its entirety, which provides details of the effects of particle size of filler on the properties of polymer blends.

Fabrication and Uses of the Disclosed Compositions

The disclosed α-olefin/vinyl or vinylidene interpolymer containing compositions can be used in a variety of sound management or other insulating applications. For example, the disclosed compositions can simultaneously and/or independently block sound waves and damp vibrating sources that cause sound waves. This invention also shows that the disclosed compositions will damp vibration across a wide and useful temperature range, and that they can be formulated to block and/or absorb sound waves. The disclosed compositions also can be filled with inert fillers, such as barium sulfate and/or calcium carbonate, to high levels which raise the resultant compound density to levels which will block sound. Further, these compositions can be readily formed into useful articles by a variety of fabrication techniques such as, for example, rotational molding, conventional plastic forming techniques, including sheet formation, profile extrusion, thermoforming, injection molding, and the like. This invention has shown that these highly filled compounds maintain the ability to manage sound equally well or better than their unfilled counterparts, and further maintain their ability to be readily formed into useful articles.

Sound Management

In general, there are three ways in which sound can be minimized or "managed." The sound waves can be blocked, the vibrations can be damped, or the noise can be absorbed. To manage sound in these various ways, articles with different characteristics are required.

Factors that are important to consider when developing various sound management articles include the frequency of the sound waves being managed, and the temperature range in which the sound management articles will be used. These parameters largely determine the desirable $T_g$ of the interpolymer or interpolymer-polymer blend component of the composition. Thus, for sound dampening applications, one will seek to correlate the $T_g$ of interpolymer or interpolymer-polymer blend component of the composition with the frequency of the sound being dampened and the temperature in which the article will function, such that the composition will be most effective in damping the sound. In certain embodiments, the compositions presently disclosed have $T_g$ at approximately room temperature, which tends to impart to the material an inherent sound-dampening capacity.

Particularly effective $T_g$ modifiers include phthalate ester plasticizers such as dioctyl phthalate (DOP). Additional factors important in sound damping applications include the tensile strength, compressibility, and flex modulus as well as the geometry of the interpolymer component of the final article. Further, as sound-damping articles must be in close contact with the item producing the sound, sound-damping articles must have a high adhesion and thermoformability. Goal parameters for sound-dampening articles include having a composite loss factor as high as possible, with a goal ratio ($\eta_c$) of resonant energy to incident energy of approximately 0.1, or greater.

In sound absorbing applications, the geometry or the form of the interpolymer or blend component of the composition is more important, with those having increased surface areas being preferred. Such preferable properties may also be expressed in terms of "pore size" of the composition.

Characteristic properties that are preferred in sound wave blocking applications include articles with a density of greater that 0.15 g/cm³. Preferred densities for effective sound blocking articles range from approximately 1.5 to about 2.6 g/cm³. The modulus of the composition, again related to temperature at which the article is fabricated, is also important. Additionally, sound blocking articles are preferably made from compositions that are compoundable, processable and moldable. A noted advantage of the disclosed compositions is that they can support high filler loading and still retain a favorable balance of properties.

Further, as filler is more economical, and increases final composition density (greater than 1.5 g/cm$^3$), the thickness of the material needed to block the sound is minimized. When fabricated into sheets, the presently disclosed compositions effectively manage sounds at sheet thicknesses as thin as 0.05 inches, with a particularly useful sheet thickness obtained at about 0.13 inches.

Maintaining Desired Physical Properties

When layered for use in sound damping, the disclosed compositions are particularly amenable to fabrication. In particular, the damping layers of articles based on the disclosed compositions have remarkable properties at the intermediate temperatures typical of thermoforming, where they hold their shape better than previous heavy layers, so that they can be draped over the thermoforming tool by automated machinery. This is despite the extreme filler levels which these compounds can be formulated to contain. Specific mechanical properties that are desireably maintained by the disclosed compositions, even at high filler levels, include elongation characteristics that are desireable at both shaping or forming termperatures as well as use temperatures. Further, the damping layers or sheets are generally softer than traditional EVA heavy layers. Increasingly, vehicle manufacturers are demanding softer barrier layers, which are better at managing sound and vibration.

Typically, Engage™ or EVA or Engage™/EVA heavy layers undergo a sharp drop in mechanical properties at between 52 and 55 volume percent filler. Above this level, the elongation to break at 80° C. is below the 100 percent required for thermoforming and the sheet will break or pinhole. In contrast, the disclosed compositions can be filled to 65 volume percent before the properties, especially the elongational properties, degrade to an unacceptable level.

The filler level above which previous materials' mechanical properties degrade has been found by experience to be generally about 52 volume percent, and when using unusually high-quality fillers, may be as high as 56 volume percent. By contrast, the disclosed compositions are able to bind 65 volume percent and above, of economic fillers before the mechanical properties degrade. As noted, articles made from the disclosed compositions are also remarkably soft with excellent drape.

The use of this filler-binding property of the substantially random interpolymers allows for improved processibility in the downstream shaping processes and their automation, and/or for the use of more economical formulations and types of fillers.

Readily Formed into Useful Articles

The disclosed compositions are advantageously amenable to a wide range of fabricating techniques for the production of economic sound management articles. They may be manipulated, by adjusting the amounts and types of components, such that they are easily molded. The compositions disclosed according to the present invention can be fabricated into films, including blown films, sheets, moldings, foam sheet, foam plank, expandable and foamable particles, moldable foam beads, and injection molded articles by conventional processes. The compositions can also be used in the manufacture of fibers, foams and lattices, as well as adhesive and sealant formulations The compositions of the present invention may be formed into articles by any suitable means known in the art and may be employed in any application in which the desired properties are useful. Included in the available means for forming the compositions disclosed herein are virtually any types of molding, extruding, calendering or casting. Specific examples of useful fabrication methods include compression and injection molding, including reaction injection molding and rreinforced reaction injection molding; calendering, extrusion coating; sheet laminating; and sheet thermoforming. Additional available fabrication methods include dry blending in a pelletized form in the desired proportions followed by melt blending in a screw extruder, an internal batch mixer (for example, a Banbury mixer), a calender or a roll mill, or the like. Other suitable processes include injection molding, compression molding, extruding, and thermoforming, including, preferably, automated thermoforming. An article may be prepared in a one-step process or a two-step process. In a one-step process, the mixing and blending steps are combined and continuously performed on an apparatus having adequate mixing capability. In the two-step process, the blend is first prepared in a granular form by a suitable mixing and pelletizing means, and then subjected to a conventional fabrication process. By employing the present compatibilizer components with their good dispersion properties, the more economical one-step process can be employed.

Sheet articles are typically extruded in one step and often subjected to thermoforming, such as for example described in U.S. Pat. No. 4,386,187, which is incorporated herein in its entirety by reference. Film articles can be prepared by extrusion and thermoforming, but also by casting or film blowing. Blown films require the interpolymer by itself, or a relatively homogeneously mixed interpolymer-polymer blend for the polymer component of the composition, which preferably is prepared in a separate step.

As sound management articles, the disclosed compositions are useful as binders for highly filled sound dampening compounds for automotive and other applications. It has been found that the level of filler that these compounds can bind without unacceptable degradation of the physical properties is significantly higher than many other polymers, which are not substantially random.

The compositions of the present invention, when employed in sound barrier layer applications are generally used in conjunction with a decoupling layer of foam or fibrous felt. The high density of the compositions of the present invention itself acts as a barrier to the transmission of sound vibrations. In addition, use of a decoupling layer (in conjunction with said high density barrier layer) prevents the direct transmission of sound vibrations from the substrate through the barrier layer (which would occur if the sound barrier layer were directly affixed to the substrate). The sound barrier layer usually has a density of between 1.5 and 2.6 g/cm$^3$. The barrier layer compound is usually calendered or extruded into a sheet, prior to thermoforming, to fit the contours of the vehicle, appliance or other structure to which it is applied. The barrier layer may then be "laminated" with the foam or fiber layer, and is often also layered with a carpet or other decorative layer. The substrate is the material of construction of the article for which sound management is required and typically comprises metal, plastic, glass, natural fibers, synthetic fibers, and wood.

Such dense thermoplastic ethylene and/or α-olefin/vinyl or vinylidene interpolymer containing compositions have many sound management uses including, but not limited to, extruded sheet to be used as a moldable sound barrier in sound deadening applications including transport systems such as automobiles, motor cycles, buses, tractors, trains trams, aeroplanes, and the like, automotive door and truck liners, rear seat strainers, wheel well covers, carpet under layments, molded dash insulators, dash mats, construction, wallpapers/coverings, and paper/textiles industries, small and large appliances, including dishwashers, refrigerators, air conditioners, and the like, household items like blender housings, power tools, lawn and garden items like leaf blowers, snow blowers, small engines like outboard motors, jet ski's, and the like. Additional applications include devices for modifying the sound of a drum, loudspeaker systems, composite sound walls, acoustically damped disc drive systems, mufflers, thermoformable acoustical mat compositions, sound damping units for vacuum cleaning machines, systems for reducing drag and noise of underwater vehicles, automotive headliners having improved sound management characteristics, sound damped automotive enclosures such as oil pans, high heat, sound damping metal-polymer laminates, molded carpet assemblies with sound deadening backing, vibration-damping constrained-layer constructions, conveyor belts and material transfer systems, sound insulation moldable carpets, non-squeal disc brake pads, and the like. Further applications include coatings for wires and cables in a variety of electronic, telecommunications and similar areas in which cable or wire coatings are desirable.

EXAMPLES

The following examples are illustrative only and are not to be construed as intended to limit the scope of the invention.

Unless indicated otherwise, the following testing procedures were employed:

The molecular weight of the polymer compositions used in the present invention is conveniently indicated using a melt index measurement according to ASTM D-1238, Condition 190° C./2. 16 kg (formally known as "Condition (E)" and also known as $I_2$).

Another useful method to indicate or determine the melt flow properties of the substantially random interpolymers used in the present invention is the Gottfert melt index (G#, $cm^3/10$ min) which is obtained in a similar fashion as for melt index ($I_2$) using the ASTM D1238 procedure for automated plastometers, with the melt density set to 0.7632, the melt density of polyethylene at 190° C.

The relationship of melt density to styrene content for ethylene-styrene interpolymers was measured, as a function of total styrene content, at 190° C. for a range of 29.8 percent to 81.8 percent by weight styrene interpolymer. Atactic polystyrene levels in these samples were typically 10 percent or less. The influence of the atactic polystyrene was assumed to be minimal because of the low levels. Also, the melt density of atactic polystyrene and the melt densities of the samples with high total styrene content are very similar. The method used to determine the melt density employed a Gottfert melt index machine with a melt density parameter set to 0.7632, and the collection of melt strands as a function of time while the $I_2$ weight was in force. The weight and time for each melt strand was recorded and normalized to yield the mass in grams per 10 minutes. The instrument's calculated $I_2$ melt index value was also recorded. The equation used to calculate the actual melt density is;

$$\delta = \delta_{0.7632} \times I_2/I_2 \text{ Gottfert}$$

where $\delta_{0.7632} = 0.7632$ and $I_2$ Gottfert=displayed melt index.

A linear least squares fit of calculated melt density versus total styrene content leads to an equation with a correlation coefficient of 0.91 for the following equation:

$$\delta = 0.000299 \times S + 0.723$$

where S=weight percentage of styrene in the polymer. The relationship of total styrene to melt density can be used to determine an actual melt index value, using these equations if the styrene content is known.

So for a polymer that is 73% total styrene content with a measured melt flow (the "Gottfert number"), the calculation becomes:

$$\delta = 0.00299 \times 73 + 0.723 = 0.9412$$

where $$0.9412/0.7632 = I_2/G\#(measured) = 1.23$$

The density of the substantially random interpolymers used in the present invention was determined in accordance with ASTM D-792. The samples are annealed at ambient conditions for 24 hours before the measurement is taken.

Interpolymer styrene content and atactic polystyrene concentration were determined using proton nuclear magnetic resonance ($^1$H N.M.R). All proton NMR samples were prepared in 1,1,2,2-tetrachloroethane-$d_2$ (TCE-$d_2$). The resulting solutions were 1.6–3.2 percent polymer by weight. Melt index ($I_2$) was used as a guide for determining sample concentration. Thus when the $I_2$ was greater than 2 g/10 min, 40 mg of interpolymer was used; with an $I_2$ between 1.5 and 2 g/10 min, 30 mg of interpolymer was used; and when the $I_2$ was less than 1.5 g/10 min, 20 mg of interpolymer was used. The interpolymers were weighed directly into 5 mm sample tubes. A 0.75 mL aliquot of TCE-$d_2$ was added by syringe and the tube was capped with a tight-fitting polyethylene cap. The samples were heated in a water bath at 85° C. to soften the interpolymer. To provide mixing, the capped samples were occasionally brought to reflux using a heat gun.

Proton NMR spectra were accumulated on a Varian VXR 300 with the sample probe at 80° C., and referenced to the residual protons of TCE-$d_2$ at 5.99 ppm. The delay times were varied between 1 second, and data was collected in triplicate on each sample. The following instrumental conditions were used for analysis of the interpolymer samples:

Varian VXR-300, standard $^1$H:
Sweep Width, 5000 Hz
Acquisition Time, 3.002 sec
Pulse Width, 8 $\mu$sec
Frequency, 300 MHz
Delay, 1 sec
Transients, 16

The total analysis time per sample was about 10 minutes.

Initially, a $^1$H NMR spectrum for a sample of the polystyrene, Styron™ 680 (available form the Dow Chemical Company, Midland, Mich.) was acquired with a delay time of one second. The protons were "labeled":b, branch; a, alpha; o, ortho; m, meta; p, para, as shown:

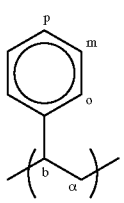

Integrals were measured around the protons labeled above; the 'A' designates aPS. Integral $A_{7.1}$ (aromatic, around 7.1 ppm) is believed to be the three ortho/para protons; and integral $A_{6.6}$ (aromatic, around 6.6 ppm) the two meta protons. The two aliphatic protons labeled α resonate at 1.5 ppm; and the single proton labeled b is at 1.9 ppm. The aliphatic region was integrated from about 0.8 to 2.5 ppm and is referred to as $A_{a1}$. The theoretical ratio for $A_{7.1}$:$A_{6.6}$:$A_{a1}$ is 3:2:3, or 1.5:1:1.5, and correlated very well with the observed ratios for the Styron™ 680 sample for several delay times of 1 second. The ratio calculations used to check the integration and verify peak assignments were performed by dividing the appropriate integral by the integral $A_{6.6}$ Ratio $A_r$ is $A_{7.1}/A_{6.6}$.

Region $A_{6.6}$ was assigned the value of 1. Ratio A1 is integral $A_{a1/A6.6}$. All spectra collected have the expected 1.5:1:1.5 integration ratio of (o+p): m: (α+b). The ratio of aromatic to aliphatic protons is 5 to 3. An aliphatic ratio of 2 to 1 is predicted based on the protons labeled α and b respectively in FIG. 1. This ratio was also observed when the two aliphatic peaks were integrated separately.

For the ethylene/styrene interpolymers, the $^1$H NMR spectra using a delay time of one second, had integrals $C_{7.1}$, $C_{6.6}$, and $C_{a1}$ defined, such that the integration of the peak at 7.1 ppm included all the aromatic protons of the copolymer as well as the o & p protons of aPS. Likewise, integration of the aliphatic region $C_{a1}$ in the spectrum of the interpolymers included aliphatic protons from both the aPS and the interpolymer with no clear baseline resolved signal from either polymer. The integral of the peak at 6.6 ppm $C_{6.6}$ is resolved from the other aromatic signals and it is believed to be due solely to the aPS homopolymer (probably the meta protons). (The peak assignment for atactic polystyrene at 6.6 ppm (integral $A_{6.6}$) was made based upon comparison to the authentic sample Styron™ 680.) This is a reasonable assumption since, at very low levels of atactic polystyrene, only a very weak signal is observed here. Therefore, the phenyl protons of the copolymer must not contribute to this signal. With this assumption, integral $A_{6.6}$ becomes the basis for quantitatively determining the aPS content.

The following equations were then used to determine the degree of styrene incorporation in the ethylene/styrene interpolymer samples:

(C Phenyl)=$C_{7.1}$ +$A_{7.1}$−(1.5×$A_{6.6}$)

(C Aliphatic)=$C_{a1}$−(1 5×$A_{6.6}$)

$s_c$=(C Phenyl)/5

$e_c$=(C Aliphatic−(3×$s_c$))/4

E=$e_c$/($e_c$+$s_c$)

$S_c$=$s_c$/($e_c$+$s_c$)

and the following equations were used to calculate the mole percent ethylene and styrene in the interpolymers:

$$Wt\% \ E = \frac{E*28}{(E*28)+(S_c*104)}(100)$$

and $$Wt\% \ S = \frac{S_c*104}{(E*28)+(S_c*104)}(100)$$

where: $s_c$ and $e_c$ are styrene and ethylene proton fractions in the interpolymer, respectively, and $S_c$ and E are mole fractions of styrene monomer and ethylene monomer in the interpolymer, respectively.

The weight percent of aPS in the interpolymers was then determined by the following equation:

$$Wt\% \ aPS = \frac{(Wt\% \ S)*\left(\frac{\frac{A_{6.6}}{2}}{S_c}\right)}{100+\left[(Wt\% \ S)*\left(\frac{\frac{A_{6.6}}{2}}{S_c}\right)\right]}*100$$

The total styrene content was also determined by quantitative Fourier Transform Infrared spectroscopy (FTIR).

Preparation of the Ethylene/Styrene Interpolymers (ESI's) 1–3

Preparation of Catalyst A;; (1H-cyclopenta[1] phenanthrene-2-yl)dimethyl(t-butylamido) -silanetitanium 1,4-diphenylbutadiene).

1) Preparation of lithium 1H-cyclopenta[1]phenanthrene-2-yl

To a 250 ml round bottom flask containing 1.42 g (0.00657 mole) of 1H-cyclopenta[1]phenanthrene and 120 ml of benzene was added dropwise, 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1H NMR analysis indicated the predominant isomer was substituted at the 2 position.

2) Preparation of (1H-cyclopenta[1]phenanthrene-2-yl) dimethylchlorosilane

To a 500 ml round bottom flask containing 4.16 g (0.0322 mole) of dimethyldichlorosilane ($Me_2SiCl_2$) and 250 ml of tetrahydrofuran (THF) was added dropwise a solution of 1.45 g (0.0064 mole) of lithium 1H-cyclopenta[1] phenanthrene-2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

3) Preparation of (1H-cyclopenta[1]phenanthrene-2-yl) dimethyl(t-butylamino)silane To a 500 ml round bottom flask containing 1.98 g (0.0064 mole) of (1H-cyclopenta[1]phenanthrene-2-yl) dimethylchlorosilane and 250 ml of hexane was added 2.00 ml (0.0160 mole) of t-butylamine. The reaction mixture was allowed to stir for several days, then filtered using diatomaceous earth filter aid (Celite™), washed twice with hexane. The product was isolated by removing residual solvent under reduced pressure. The isolated yield was 1.98 g (88.9 percent).

4) Preparation of dilithio (1H-cyclopenta[1]phenanthrene-2-yl)dimethyl(t-butylamido)silane To a 250 ml round bottom flask containing 1.03 g (0.0030 mole) of (1H-cyclopenta[1]phenanthrene-2-yl)dimethyl(t-butylamino)silane) and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

5) Preparation of (1H-cyclopenta[1]phenanthrene-2-yl) dimethyl(t-butylamido)silanetitanium dichloride To a 250 ml round bottom flask containing 1.17 g (0.0030 mole) of $TiCl_3$.3THF and about 120 ml of THF was added at a fast drip rate about 50 ml of a THF solution of 1.08 g of dilithio (1H-cyclopenta[1]phenanthrene-2-yl)dimethyl(t- butylamido)silane. The mixture was stirred at about 20 °C. for 1.5 hr at which time 0.55 gm (0.002 mole) of solid $PbCl_2$ was added. After stirring for an additional 1.5 hr the THF was removed under vacuum and the residue was extracted with toluene, filtered and dried under reduced pressure to give an orange solid. Yield was 1.31 g (93.5 percent).

6) Preparation of (1H-cyclopenta[1]phenanthrene-2-yl) dimethyl(t-butylamido)silanetitanium 1,4-diphenylbutadiene To a slurry of (1H-cyclopenta[1]phenanthrene-2-yl) dimethyl(t-butylamido)silanetitanium dichloride (3.48 g, 0.0075 mole) and 1.551 gm (0.0075 mole) of 1,4-diphenylibutadiene in about 80 ml of toluene at 70 °C. was add 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about −20° C. and the volatiles were removed under reduced pressure. The residue was slurried in 60 ml of mixed hexanes at about 20° C. for approximately 16 hours. The mixture was cooled to about −25° C. for about 1 hour. The solids were collected on a glass frit by vacuum filtration and dried under reduced pressure. The dried solid was placed in a glass fiber thimble and solid extracted continuously with hexanes using a Soxhlet extractor. After 6 hours a crystalline solid was observed in the boiling pot. The mixture was cooled to about −20° C., isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 g of the desired product as a dark crystalline solid.

Polymerization

ESI 1 was prepared in a continuously operating loop reactor (36.8 gal). An Ingersoll-Dresser twin screw pump provided the mixing. The reactor ran liquid full at 475 psig (3,275 kPa) with a residence time of approximately 25 minutes. Raw materials and catalyst/cocatalyst flows were fed into the suction of the twin screw pump through injectors and Kenics static mixers. The twin screw pump discharged into a 2 inch diameter line which supplied two Chemineer-Kenics 10-68 Type BEM Multi-Tube heat exchangers in series. The tubes of these exchangers contained twisted tapes to increase heat transfer. Upon exiting the last exchanger, loop flow returned through the injectors and static mixers to the suction of the pump. Heat transfer oil was circulated through the exchangers' jacket to control the loop temperature probe located just prior to the first exchanger. The exit stream of the loop reactor was taken off between the two exchangers. A MicroMotion measured the flow and solution density of the exit stream.

Solvent feed to the reactor was supplied by two different sources. A fresh stream of toluene from an 8480-S-E Pulsafeeder diaphragm pump with rates measured by a Micro-Motion flowmeter was used to provide flush flow for the reactor seals (20 lb/hr (9.1 kg/hr)). Recycle solvent was mixed with uninhibited styrene monomer on the suction side of five 8480-5-E Pulsafeeder diaphragm pumps in parallel. These five Pulsafeeder pumps supplied solvent and styrene to the reactor at 650 psig (4,583 kPa). Fresh styrene flow was measured by a MicroMotion flowmeter, and total recycle solvent/styrene flow was measured by a separate MicroMotion flowmeter. Ethylene was supplied to the reactor at 687 psig (4,838 kPa). The ethylene stream was measured by a Micro-Motion mass flowmeter. A Brooks flowmeter/controller was used to deliver hydrogen into the ethylene stream at the outlet of the ethylene control valve.

The ethylene/hydrogen mixture combined with the solvent/styrene stream at ambient temperature. The temperature of the entire feed stream as it entered the reactor loop was lowered to 2° C. by an exchanger with −10° C. glycol on the jacket. Preparation of the three catalyst components took place in three separate tanks: fresh solvent and concentrated catalyst/cocatalyst premix were added and mixed into their respective run tanks and fed into the reactor via variable speed 680-S-AEN7 Pulsafeeder diaphragm pumps. As previously explained, the three component catalyst system entered the reactor loop through an injector and static mixer into the suction side of the twin screw pump. The raw material feed stream was also fed into the reactor loop through an injector and static mixer downstream of the catalyst injection point but upstream of the twin screw pump suction.

Polymerization was stopped with the addition of catalyst kill (water mixed with solvent) into the reactor product line after the Micro Motion flowmeter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure was dropped from 475 psig (3,275 kPa) down to 450 mmHg (60 kPa) of absolute pressure at the reactor pressure control valve.

This flashed polymer entered the first of two hot oil jacketed devolatilizers. The volatiles flashing from the first devolatizer were condensed with a glycol jacketed exchanger, passed through the suction of a vacuum pump, and were discharged to the solvent and styrene/ethylene separation vessel. Solvent and styrene were removed from the bottom of this vessel as recycle solvent while ethylene exhausted from the top. The ethylene stream was measured with a MicroMotion mass flowmeter. The measurement of vented ethylene plus a calculation of the dissolved gases in the solvent/styrene stream were used to calculate the ethylene conversion. The polymer and remaining solvent separated in the devolatilizer was pumped with a gear pump to a second devolatizer. The pressure in the second devolatizer was operated at 5 mm Hg (0.7 kPa) absolute pressure to flash the remaining solvent. This solvent was condensed in a glycol heat exchanger, pumped through another vacuum pump, and exported to a waste tank for disposal. The dry polymer (<1000 ppm total volatiles) was pumped with a gear pump to an underwater pelletizer with 6-hole die, pelletized, spin-dried, and collected in 1000 lb boxes.

ESI #'s 2 and 3, were prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. Heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

Toluene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr ( 0.34 kg/ hr)). These flows were measured by differential pressure flow meters and controlled by manual adjustment of micro-flow needle valves. Uninhibited styrene monomer was supplied to the reactor at 30 psig (207 kpa). The feed to the reactor was measured by a Micro-Motion mass flow meter. A variable speed diaphragm pump controlled the feed rate. The styrene stream was mixed with the remaining solvent stream.

Ethylene was supplied to the reactor at 600psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor.

The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

The various catalysts, co-catalysts and process conditions used to prepare the various individual ethylene styrene interpolymers (ESI #'s 1–3) are summarized in Table 1 and their properties are summarized in Table 2.

TABLE 1

Preparation Conditions for ESI #'s 1–3

| ESI # | Reactor Temp ° C. | Solvent Flow lb/hr | Ethylene Flow lb/hr | Hydrogen Flow sccm | Styrene Flow lb/hr | Ethylene Conversion % | B/Ti Ratio | MMAO[d]/Ti Ratio | Catalyst | Co-Catalyst |
|---|---|---|---|---|---|---|---|---|---|---|
| ESI 1 | 95.0 | 404 | 41 | 582 | 42 | 93 | 5.2 | 6.5 | B[b] | C[c] |
| ESI 2 | 74.1 | 283 | 35 | 238 | 123 | 92 | 4.4 | 15.1 | A[a] | C[c] |
| ESI 3 | 100.8 | 32.00 | 3.67 | 34 | 2.4 | 92.39 | 5.00 | 5 | A[a] | C[c] |

[a]Catalyst A is (1H-cyclopenta[1]phenanthrene-2-yl)dimethyl(t-butylamido)-silanetitanium 1,4-diphenylbutadiene)
[b]Catalyst b is (t-butylamido)dimethyl(tetramethylcyclopentadienyl)silane-titanium (II) 1,3-pentadiene prepared as in U.S. Pat. No. 5,556,928, Ex. 17.
[c]Cocatalyst C is tris(pentafluorophenyl)borane, (CAS# 001109-15-5),
[d]a modified methylaluminoxane commercially available from Akzo Nobel as MMAO-3A (CAS# 146905-79-5)

TABLE 2

Properties of ESI #'s 1–3

| ESI # | Copolymer Styrene (wt %) | Copolymer Styrene (mol %) | APS (wt %) | G# (cm³/10 min) |
|---|---|---|---|---|
| ESI 1 | 31.7 | 11.1 | 0.3 | 1.08 |
| ESI 2 | 74.7 | 44.3 | 8.0 | 1.34 |
| ESI 3 | 69.8 | 38.4 | 5.6 | 0.93 |

Example 1 and Comparative 1

Organic Acid Improves Elongation Relative To Comparative 1

A sample of 180 grams of ESI 1, was placed in a Haake Mixer at 180° C. at 80 RPM for 5 minutes. The molten polymer was removed and a sheet of uniform thickness was prepared using a Tetrahedron Press. The acid containing blend utilized the sample procedure except that 0.3 grams of stearic acid was added to 179.7 grams of the same polymer in the mixture.

For these two blended samples, 85 grams was placed in a chase between two sheets of Teflon coated fabric in the Tetrahedron Press. The plaques were made using the following program: 1) 10,000 psi for 5 minutes at 350° F., 2) 50,000 psi for 5 minutes at 375° F. and 3) 50,000 psi for 10 seconds at 150° F.

Tensile bars were cut from the plaques and tested in accordance to ASTM D-638 Type 4 and pulled at a rate of 10 in/min. The data for each sample is the average of 5 test pieces.

TABLE 3

Effect of Organic Acid on Elongation

|  | Polymer | Ultimate Strength (PSI) | Elongation (%) |
|---|---|---|---|
| Example 1 | ESI #1 w/acid | 5300 | 620 |
| Comparative 1 | ESI #1 | 4950 | 575 |

Example 2–3 and Comparative 2

Organic Acid Decreases the Mixer Torque

The compositions were prepared by adding 7.77 weight percent of ESI #1 and 3.89 weight percent of Engage™ 8100 to a lab-scale internal mixer pre-heated to 180° C. After the polymer was molten, 4.7 weight percent of Shellflex™ 371 paraffinic oil was added, followed by 82.73 weight percent (62.92 volume percent) of a 15 μm particle size calcite (Calcicoll W15 from Alpha Calcite, Germany), together with 0.5 weight percent carbon black.

The filler was added in stages to prevent an excessively high torque and the breakage of the shear pins. The mixer was allowed to reach a steady state and a torque of 140 Nm at 45 rpm was recorded (Comparative Example 2). The addition of 0.28 weight percent (0.55 volume percent) of stearic acid was added to the mixer and the torque dropped rapidly to 79 Nm (Example 2).

For Example 3 the filler and stearic acid were added together, and the torque peak was much more moderate (<90 Nm) and never spiked during processing, thus presenting no danger to the integrity of the mixer. The filler was added at one time if stearic acid was added prior to the addition of filler.

TABLE 4

Effect of Organic Acid on Mixer Torque

| Example # | Polymer | Torque before acid (Nm) | Torque after acid addition (Nm) |
|---|---|---|---|
| Ex. 2 | ESI #1 |  | 79 |
| Ex. 3 | ESI #1 (acid added at the start) |  | <90 |
| Comp. Ex. 2 | ESI #1 | 140 |  |

Examples 4–8

Compositions Maintain Desirable Properties when Blended with Other Polymers

The mixtures were prepared by adding 11.1 weight percent of ESI #1 to a lab-scale internal mixer pre-heated to 150° C. After the polymer was molten, 6.5 weight percent of Shellflex 371 paraffinic oil was added, followed by 82 weight percent of a 15 μm particle size calcite (Calcicoll W15 from Alpha Calcite, Germany), together with 0.3 weight percent stearic acid and 0.5 weight percent carbon black.

The presence of a sufficient amount of oil (greater than 50 percent of the amount of polymer, i.e. an oil:polymer ratio of >0.5) and the stearic acid facilitate production of a damping sheet with desireable properties.

The ingredients were mixed for 4 minutes after which time the mass had reached 150–156° C. The viscosity, measured by the torque generated on the mixer blades was not high, being only 20 percent higher than a typical EVA-based formulation under the same conditions. The hot mass was passed once through a cold roll mill to make a 2 mm thick sheet that was then laid flat on a table to cool.

Some of the α-olefin/vinyl or vinylidene (in this case ethylene/styrene) interpolymer was replaced by Engage™ (product and trademark of DuPont Dow Elastomers), Exact™ (product and trademark of Exxon), Elvax™ EVA (product and trademark of E.I. DuPont de Nemours) or Clearflex™ (product and trademark of Enichem).

TABLE 5

Effect of Polymer B on Properties

| Polymer B | Example 4 | Example 5 Engage 8003 | Example 6 Exact ZM009 | Example 7 Elvax 265 EVA | Example 8 Clearflex CHGO |
|---|---|---|---|---|---|
| % Polymer B |  | 25 | 25 | 25 | 25 |
| % ESI #1 | 100 | 75 | 75 | 75 | 75 |
| Melt Index (I₂) | 1 | 1 | 10 | 2 | 1 |
| Density (g/cm³) |  | 0.885 | 0.880 |  | 0.890 |
| Torque (Nm) | 400 | 400 | 200 | 400 | 300 |
| Sticky on mixer? | No | No | No | Yes | No |
| UTS at 80° C., (Mpa) | 0.066 | 0.08 | 0.07 | 0.08 | 0.08 |
| Elongation at 80° C., (%) | 138 | 131 | 148 | 132 | 91 |
| Tear strength, (kN/m) | 5.6 | 5.6 | 5.6 | 6.6 | 5.5 |
| Hardness (Shore A) | 75 | 70 | 72 | 78 | 69 |

It is seen that, within narrow limits, the properties of these formulations are similar and fulfill the desired requirements. The torque on the mixer is proportional to the viscosity of the components, the stickiness of the EVA is a physico-chemical property of the EVA, as is the small increase in hardness in the EVA containing formulation.

Examples 9 and 10 and Comparative 3

Compositions Dampen Sound

Tests were made on a fixture to measure modes of vibration of the test sample using a random noise signal. The results are in terms of Composite Loss Factor obtained using the Oberst Bar test method (see FIG. 1). Composite Loss Factor is a measure of the ability of the material to stop vibration that causes noise. The higher the Composite Loss Factor, the better the ability to stop vibration.

The resonant frequency and half the power bandwidth (frequency difference between 3 dB down points from the resonant peak) of each mode needed for composite loss factor ($\eta_c$) computation, were read directly from a dual channel signal analyzer (B&K Type 2032).

The test samples were bonded on to the steel Oberst bar by compression molding. The Oberst bar was placed in the center of a chase and loose polymer was laid on the metal bar. The chase was covered on both sides with Mylar and placed in a compression molder. The heating cycle conforms to ASTM standard D1325. Excess polymer was cut away from the Oberst by using a razor blade.

The dimensions of the bar were: total length 225 mm, free length 200 mm, thickness 0.8 mm, and width 12.7 mm. Test procedures were in accordance with SAE Recommended Practice J1637, *Laboratory Measurement of the Composite Vibration Damping Properties of Materials on a Supporting Steel Bar* with certain exceptions (see FIG. 1).

Table 6 shows the Resonance Frequency (Hz) and resultant Composite Loss Factor ($\eta_c$) for Comparative 4 and ESI #2, and ESI #3 all tested at 25° C. The results show that ESI #2 has comparable Composite Loss Factor to Comparative 4, which is the industry standard. However, ESI #3 is shown to have superior Composite Loss Factor to Comparative 4.

TABLE 6

Results Of Oberst Bar Damping Test At 25° C.

| Sample | Mode | Resonance Frequency (Hz) | Composite Loss Factor $\eta_c$ |
|---|---|---|---|
| Comparative #4 | 2 | 84 | 0.016 |
| | 3 | 239 | 0.020 |
| | 4 | 467 | 0.020 |
| | 5 | 773 | 0.027 |
| | 6 | 1161 | 0.023[1] |
| ESI #2 | 2 | 123 | 0.030 |
| | 3 | 350 | 0.023 |
| | 4 | 696 | 0.020 |
| | 5 | 1161 | 0.020 |
| | 6 | 1737 | 0.017 |
| | 7 | 2438 | 0.014[1] |
| ESI #3 | 2 | 91 | 0.134 |
| | 3 | 270 | 0.131 |
| | 4 | 547 | 0.114 |
| | 5 | 923 | 0.103 |
| | 6 | 1329 | 0.098[1] |

[1]3dB downpoint one side of resonant peak.

What is claimed is:

1. A composition comprising:
   (1) one or more non-crosslinked substantially random interpolymeric comprising
      a) polymer units derived from;
         i) at least one vinyl or vinylidene aromatic monomer; or
         ii) at least one hindered aliphatic or cycloaliphatic vinyl or vinylidene monomer; or
         iii) a combination of at least one vinyl or vinylidene aromatic monomer and at least one hindered aliphatic or cycloaliphatic vinyl or vinylidene monomer; and
   b) polymer units derived from;
      i) ethylene; or
      ii) one or more $C_{3-20}$ α-olefins; or
      iii) a combination of ethylene; and/or one or more $C_{3-20}$ α-olefins; and
   (2) at least one organic acid or salt thereof.

2. The composition of claim 1, further comprising a processing agent, or a filler, or both.

3. The composition of claim 1 or 2, in which the substantially random interpolymer further comprises polymer units derived from one or more ethylenically unsaturated polymerizable monomers other than (1)(a) or (1)(b).

4. The composition of claim 1 and 2, further comprising a second polymer component, blended with said interpolymer.

5. The composition of claim 4, wherein
   a) said substantially random interpolymer is one or more of an ethylene/styrene interpolymer, an ethylene/propylene/styrene interpolymer, or an an ethylene/styrene/norbornene interpolymer; and
   b) said second polymer component is one or more of any ethylene and/or $C_3$–$C_{20}$ α-olefin homo or interpolymer, a styrenic homopolymer, copolymer or block copolymer, or comprises vinyl acetate functionality, or halogen-containing groups.

6. The composition of claim 4, wherein said second polymer component is selected from the group consisting of ethylene-vinyl acetate (EVA), polyolefin (PO), low density polyethylene (LDPE), ethylene propylene diene monomer (EPDM), styrene butadiene co-polymer (SBS copolymer), styrene butadiene random polymer (SBR), ethylene octene co-polymer (EO); polypropylene (PP), polypropylene copolymers (CPP), and polyvinylchloride (PVC), or mixtures thereof.

7. The composition of claim 1, wherein said substantially random interpolymer comprises from about 4.9 to about 99.99 weight percent of the total composition.

8. The composition of claim 4, wherein said substantially random interpolymer comprises from about 25 to about 95 weight percent, and said other polymer represents from about 5 to about 75 weight percent (based on the weight of said interpolymer and said second polymer).

9. The composition of claim 1, wherein said organic acid comprises from about 0.01 to about 5 weight percent of the total composition.

10. The composition of claim 2, wherein said processing agent comprises from 0.25 to about 50 weight percent of the total composition.

11. The composition of claim 2, wherein said filler comprises from 0.01 to about 95 weight percent of the total composition.

12. The composition of claim 1, wherein said organic acid is selected from the group consisting of saturated mono-, di-, and tricarboxylic acids having from 6 to 60 carbon atoms, and unsaturated mono-, di-, and tri-carboxylic acids having from 6 to 60 carbon atoms, and salts thereof.

13. The composition of claim 1, wherein said organic acid is selected from the group consisting of stearic acid, palmitic acid, and an oleic acid or a salt thereof.

14. The composition of claim 13, wherein said organic acid is stearic acid or a salt thereof.

15. The composition of claim 1, wherein said one or more organic acid or salt thereof is selected from the group consisting of stearic acid, calcium stearate, magnesium stearate, ammonium stearate, zinc stearate, stearamide, calcium oleate, magnesium oleate, and zinc oleate or mixtures thereof.

16. The composition of claim 2, wherein said processing agent is selected from the group consisting of tackifiers, oils, plasticizers and mixtures thereof.

17. The composition of claim 16, wherein said tackifier is selected from the group consisting of natural or synthetic resin materials, rosin materials and mixtures thereof.

18. The composition of claim 16, wherein said oil is selected from the group consisting of mineral, napthenic, aromatic and parafinic oils.

19. The composition of claim 16, wherein said plasticizer is selected from the group consisting of phthalate esters, trimellitate esters, polymeric plasticizers and mixtures thereof.

20. The composition of claim 2, wherein said filler is selected from the group consisting of alumina trihydrate, magnesium hydroxide, calcium hydroxide, talc, calcium carbonate, limestone, glass fibers, marble dust, cement dust, clay, feldspar, silica or glass, fumed silica, alumina, magnesium oxide, antimony oxide, zinc oxide, barium sulfate, aluminum silicate, calcium silicate, titanium dioxide, titanates, glass microspheres chalk and mixtures thereof.

21. The composition of claim 2, wherein said filler is selected from the group consisting of calcium carbonate, barium sulfate, and alumina trihydrate, and mixtures thereof.

22. The composition of claim 1, wherein said substantially random interpolymer comprises from about 8 mole percent to about 50 mole percent styrene.

23. A sound management article comprising a substrate and a sound barrier layer wherein said sound barrier layer comprises;
   (1) one or more non-crosslinked substantially random interpolymers comprising
      a) polymer units derived from;
         i) at least one vinyl or vinylidene aromatic monomer; or
         ii) at least one hindered aliphatic or cycloaliphatic vinyl or vinylidene monomer; or
         ii) a combination of at least one vinyl or vinylidene aromatic monomer and at least one hindered aliphatic or cycloaliphatic vinyl or vinylidene monomer; and
      b) polymer units derived from;
         i) ethylene; or
         iii) one or more $C_{3-20}$ α-olefins; or
         iii) a combination of ethylene; and/or one or more $C_{3-20}$ α-olefins; and
   (2) at least one organic acid or salt thereof.

24. The sound management article of claim 23, wherein the substrate is selected from the group consisting of metal, plastic, glass, natural fibers, synthetic fibers, and wood.

25. A process which comprises mixing
   (1) one or more non-crosslinked substantially random interpolymer comprising
      a) polymer units derived from;
         i) at least one vinyl or vinylidene aromatic monomer; or
         ii) at least one hindered aliphatic or cycloaliphatic vinyl or vinylidene monomer; or
         iii) a combination of at least one vinyl or vinylidene aromatic monomer and at least one hindered aliphatic or cycloaliphatic vinyl or vinylidene monomer; and
      b) polymer units derived from;
         i) ethylene; or
         ii) one or more $C_{3-20}$ α-olefins; or
         iii) a combination of ethylene; and/or one or more C3–20 α-olefins; and
   (2) at least one organic acid or salt thereof.

26. A composition comprising
   (A) from about 5 to about 90 weight percent by weight of at least one non-crosslinked substantially random interpolymer prepared by polymerizing one or more α-olefin monomers with one or more vinyl or vinylidene aromatic monomers, and optionally with other polymerizable ethylenically unsaturated monomer(s);
   (B) from about 10 to about 94.9 percent by weight of at least one filler selected from talc, calcium carbonate, glass fibers, marble dust, cement dust, clay, feldspar, silica or glass, fumed silica, alumina, magnesium oxide, antimony oxide, zinc oxide, barium sulfate, aluminum silicate, calcium silicate, titanium dioxide, titanates, glass microspheres and chalk;
   (C) from about 0.01 to about 5 weight percent of an organic acid or salt thereof; and
   (D) from about 0.1 to about 10 percent by weight of at least one initiator or at least one coupling agent selected from the group consisting of organic peroxides, silanes, titanates, zirconates, multifunctional vinyl compounds and organic azides;
   wherein the amounts of (A), (B), (C) and (D) are based on the total weight of (A), (B), (C) and (D).

27. The sound management article of claim 23, further comprising a processing agent, or a filler, or both.

28. The sound management article of claim 23, in which the substantially random interpolymer further comprises polymer units derived from one or more ethylenically unsaturated polymerizable monomers other than (1)(a) or (1)(b).

29. The sound management article of claim 23, further comprising a second polymer component, blended with said interpolymer.

30. The sound management article of claim 29, wherein
   a) said substantially random interpolymer is one or more of an ethylene/styrene interpolymer, an ethylene/propylene/styrene interpolymer, or an an ethylene/styrene/norbornene interpolymer, and
   b) said second polymer component is one or more of any ethylene and/or $C_3$–$C_{20}$ α-olefin homo or interpolymer, a styrenic homopolymer, copolymer or block copolymer, or comprises vinyl acetate functionality, or halogen -containing groups.

31. The sound management article of claim 29, wherein said second polymer component is selected from the group consisting of ethylene-vinyl acetate (EVA), polyolefin (PO), low density polyethylene (LDPE), ethylene propylene diene monomer (EPDM), styrene butadiene co-polymer (SBS copolymer), styrene butadiene random polymer (SBR), ethylene octene co-polymer (EO); polypropylene (PP), polypropylene copolymers (CPP), and polyvinylchloride (PVC), or mixtures thereof.

32. The sound management article of claim 23, wherein said substantially random interpolymer comprises from about 4.9 to about 99.99 weight percent of the total composition.

33. The sound management article of claim 29, wherein said substantially random interpolymer comprises from about 25 to about 95 weight percent, and said other polymer represents from about 5 to about 75 weight percent (based on the weight of said interpolymer and said second polymer).

34. The sound management article of claim 23, wherein said organic acid comprises from about 0.01 to about 5 weight percent of the total composition.

35. The sound management article of claim 27, wherein said processing agent comprises from 0.25 to about 50 weight percent of the total composition.

36. The sound management article of claim 27, wherein said filler comprises from 0.01 to about 95 weight percent of the total composition.

37. The sound management article of claim 23, wherein said organic acid is selected from the group consisting of saturated mono-, di-, and tricarboxylic acids having from 6 to 60 carbon atoms, and unsaturated mono-, di-, and tricarboxylic acids having from 6 to 60 carbon atoms, and salts thereof.

38. The sound management article of claim 23, wherein said organic acid is selected from the group consisting of stearic acid, palmitic acid, and an oleic acid or a salt thereof.

39. The sound management article of claim 38, wherein said organic acid is stearic acid or a salt thereof.

40. The sound management article of claim 23, wherein said one or more organic acid or salt thereof is selected from the group consisting of stearic acid, calcium stearate, magnesium stearate, ammonium stearate, zinc stearate, stearamide, calcium oleate, magnesium oleate, and zinc oleate or mixtures thereof.

41. The sound management article of claim 27, wherein said processing agent is selected from the group consisting of tackifiers, oils, plasticizers and mixtures thereof.

42. The sound management article of claim 41, wherein said tackifier is selected from the group consisting of natural or synthetic resin materials, rosin materials and mixtures thereof.

43. The sound management article of claim 41, wherein said oil is selected from the group consisting of mineral, napthenic, aromatic and parafinic oils.

44. The sound management article of claim 41, wherein said plasticizer is selected from the group consisting of phthalate esters, trimellitate esters, polymeric plasticizers and mixtures thereof.

45. The sound management article of claim 27, wherein said filler is selected from the group consisting of alumina trihydrate, magnesium hydroxide, calcium hydroxide, talc, calcium carbonate, limestone, glass fibers, marble dust, cement dust, clay, feldspar, silica or glass, fumed silica, alumina, magnesium oxide, antimony oxide, zinc oxide, barium sulfate, aluminum silicate, calcium silicate, titanium dioxide, titanates, glass microspheres, chalk and mixtures thereof.

46. The sound management article of claim 27, wherein said filler is selected from the group consisting of calcium carbonate, barium sulfate, and alumina trihydrate, and mixtures thereof.

47. The sound management article of claim 23, wherein said substantially random interpolymer comprises from about 8 mole percent to about 50 mole percent styrene.

* * * * *